United States Patent [19]

Caluwaerts

[11] Patent Number: 5,384,135
[45] Date of Patent: Jan. 24, 1995

[54] PROCESS FOR THE MANUFACTURE OF AN ALCOHOL-FREE BEER HAVING THE ORGANOLEPTIC PROPERTIES OF A LAGER TYPE PALE BEER

[75] Inventor: Henri J. J. Caluwaerts, Fribourg, Switzerland

[73] Assignee: Brasserie Du Cardinal Fribourg S.A., Fribourg, Switzerland

[21] Appl. No.: 21,253

[22] Filed: Feb. 23, 1993

[30] Foreign Application Priority Data

Mar. 10, 1992 [CH] Switzerland ............................ 776/92

[51] Int. Cl.$^6$ .......................... C12G 3/08; C12G 3/12; C12C 11/04
[52] U.S. Cl. ......................................... 426/14; 426/16; 426/493
[58] Field of Search .................... 426/14, 16, 493, 592

[56] References Cited

U.S. PATENT DOCUMENTS

| 721,383 | 2/1903 | Nilson | 426/14 |
| 4,746,517 | 5/1988 | Ducroo | 426/12 |
| 5,034,238 | 7/1991 | Seidlitz et al. | 426/330.4 |

FOREIGN PATENT DOCUMENTS 2127  4/1900  United Kingdom ................. 426/14

*Primary Examiner*—Donald E. Czaja
*Assistant Examiner*—Curtis E. Sherrer
*Attorney, Agent, or Firm*—Dvorak and Traub

[57] ABSTRACT

A process for the manufacture of an alcohol-free pale beer (AFB) whose organoleptic properties are those of a lager beer, comprising the manufacture of a lager type alcoholic pale beer from pale malts containing 20 to 30% of brown malts, mashed to obtain a wort whose attenuation is of the order of 50% and the dealcoholization of the alcoholic pale beer, by evaporation, under high vacuum, of at least about 50% of the volume of this beer. The concentrate obtained by evaporation may be rediluted with water, flavored and sweetened until a concentration of 4° Brix is obtained in order to produce the AFB. The concentrate may also be subjected to a second vacuum evaporation at a temperature of less than 60° C. until a concentrate assaying between 45° and 65° Brix is obtained which is storable for several months before the redilution into an AFB.

18 Claims, 3 Drawing Sheets

PROCESS FOR THE MANUFACTURE OF AN ALCOHOL-FREE BEER HAVING THE ORGANOLEPTIC PROPERTIES OF A LAGER TYPE PALE BEER

FIELD OF THE INVENTION

The present invention relates to a process for the manufacture of an alcohol-free beer having the organoleptic properties of a lager type pale ale.

There is currently an increasing demand for low-alcohol or alcohol-free beers among a population which is concerned about its health, about diet or about safety in the workplace or within the framework of the road traffic. There are also countries where alcohol consumption is completely forbidden by law but where consumers would like to have a drink which, although free of alcohol, has nevertheless organoleptic properties which are as close as possible to one of the conventional types of beer.

The legal definitions of a "low-alcohol" or "alcohol-free" beer, or at least one which is generally accepted, varies from one country to another. A low alcohol beer is for example defined in Germany as a beer assaying 0.5–1.5% by weight of ethanol, and an alcohol-free beer as a beer assaying less than 0.5% ethanol. The standards in Arabic countries are more severe: a beer is termed alcohol-free when it assays less than 0.1% by volume, and preferably less than 0.05% by weight, that is to say below the usual analytical detection limit.

PRIOR ART

Various processes exist for adding flavor to non-alcoholic aqueous solutions so as to give them organoleptic properties more or less similar to those of a beer. These processes involve either the addition of flavoring substances (some of which are commercially available), or require the use of yeasts under conditions where the latter are not physiologically capable of producing an alcoholic fermentation but can nevertheless excrete metabolites which help to give a beer taste to the solution (see for example CH-646 844). Generally, these processes are not completely satisfactory since the drinks thus obtained are quite different, from the organoleptic point of view, from a true beer and they often have an "artificial flavor" beer taste.

Patent EP 245 845 describes a process for the manufacture of a low-alcohol or, where appropriate, an alcohol-free (<0.1% EtOH) beer from an ordinary alcoholic beer, in which the alcohol is removed from the beer by gaseous entrainment at room temperature, either by means of dry air or by means of air saturated with water vapor. The volume of liquid removed is compensated for using pure water, optionally by blending with a normal alcoholic beer; flavor losses are compensated for as above (flavoring substances or yeasts releasing flavoring substances); the liquid is saturated with $CO_2$ in order to remove oxygen and for it to be recarbonated. This process therefore makes it possible to manufacture a slightly alcoholic beer (about 1.4%), in the case of blending with a normal beer, or a beer which is practically free of alcohol ($\leq 0.1\%$); but entrainment with air at room temperature does not make it possible to achieve a $H_2O/EtOH$ separation which meets the most severe standards for alcohol-free beers.

Several documents describe processes for the dealcoholization of ordinary alcoholic beers in which the separation of EtOH is based on the principle of distillation.

Patent CH-591 817 describes a process for the manufacture of low-alcohol beer (EtOH content between 0.2 and 1%) from a normally alcoholic beer, in which the EtOH/$H_2O$ separation is performed by spraying the beer, heated to 55° C., at a pressure of 2 kg/cm² in a separation column.

The document DE-PS 1,442,269 describes a process of dealcoholization by distillation under vacuum, in which an ordinary beer, previously pressurized, is degassed at a pressure of about 1 bar (with recovery of the foam and the flavor compounds) and then dealcoholized by means of a vacuum evaporator (0.05–0.12 bar), at between 30° and 50° C. The foam and the flavor compounds are reinjected after dealcoholization, and the beer is then recarbonated at low temperature. By virtue of the operating conditions, this dealcoholized beer necessarily contains a detectable residual EtOH content.

The document DE-38 19 527 describes a similar process, in which the flavor compounds contained in the alcoholic phase are extracted by means of $CO_2$ under pressure and reinjected into the alcohol-free beer.

Generally, beers dealcoholized using these processes are accused of having a flat and unbalanced taste.

Finally, Patent EP-235 626 describes a process for the dealcoholization of yeast-containing light ale, consisting in first separating the yeast from the beer, in then subjecting the beer to a distillation under a vacuum of 0.06 to 0.1 bar, at between 38° and 48°, compensating for the loss of water (about 20–30%) due to the distillation, then adding a top fermentation yeast, allowing the product to stand at low temperature, separating this yeast and finally recarbonating the product and adding a certain quantity of yeast characteristic of this type of beer. Beers assaying less than 0.5% by volume of EtOH can be obtained by this process.

These processes for the manufacture of alcohol-free beers, from ordinary alcoholic beers (that is to say normally intended for consumption) therefore result in so-called alcohol-free beers, but which still contain too much alcohol to satisfy the most severe legal standards, and/or in drinks whose organoleptic qualities are inferior to those of the original ordinary beers.

SUMMARY OF THE INVENTION

The aim of the present invention is to allow the manufacture of an alcohol-free beer satisfying the most severe standards, that is to say assaying less than 0.05% EtOH and whose organoleptic qualities are those of a normal beer.

This aim is achieved by means of a process comprising
- the manufacture of a lager type alcoholic pale ale from pale malts containing not less than 12% of nitrogenous substances and from 20 to 30% of brown malts mashed so as to obtain a wort whose attenuation is of the order of 50% and original gravity of the order of 16%
- the dealcoholization of the said alcoholic pale ale by evaporation, under high vacuum, of at least about 50% of the volume of this beer.

Preferably, in the process 2.3 to 2.5 m³ of water are used for doughing in one ton of malt and 360 to 550 g of $\beta$-glucanase are added per ton of doughed-in malt.

Preferably, in the process the mashing is carried out by infusion, the doughing-in time is reduced to less than 40 min and the rise to the saccharification temperature is performed at a rate of not less than 3° C./min, so that the fermentable sugars represent not more than 50% of the total extract.

Preferably, in the process the fermentable sugars are completely removed during fermentation and after maturation, the beer is filtered and stabilized by the addition of polyvinyl-polypyrolidone.

Preferably, in the process said evaporation is performed continuously and comprises:
- a decarbonation stage at a pressure of 0.06–0.1 bar, during which a portion of the ethanol and the flavor compounds are entrained by $CO_2$ and partially condensed.
- a distillation stage at a pressure of 0.06–0.1 bar, at a temperature of between 50° and 65° C., the flavor compounds condensed with the ethanolic phase being partially extracted and recovered.

Preferably, in the process, the concentrate obtained by said evaporation is diluted with demineralized and deoxygenated water until a concentration of 3° Brix is obtained and the dilute solution obtained is supplemented with a quantity of sucrose equivalent to 1° Brix.

Preferably, in the process between the distillation and the dilution, said concentrate is supplemented with 140 to 200 g of activated charcoal per hectoliter of said concentrate, then stored for about 18 hours at 5° C., and said concentrate is separated from said activated charcoal before said dilution.

Preferably in the process said dilute solution is flavored by means of flavor compounds chosen from the flavor compounds condensed and recovered during the evaporation, essential oils of fine hops, preisomerized hop extracts and naturally occurring flavor components of beer.

Preferably, in the process said concentrate, obtained by said evaporation, is subjected to a second vacuum evaporation, at a temperature of less than 60° C. until a concentrate assaying between 45° and 65° Brix is obtained.

Preferably in the process said concentrate is pasteurized and aseptically drawn off into airtight, aseptic and anaerobic containers.

Preferably, in the process said concentrate is prediluted with demineralized and deoxygenated water until a syrup with a concentration of the order of 20° Brix is obtained and said syrup undergoes an enzymatic treatment, at about 18° C., for a period of 18 to 24 hours.

Preferably, in the process said enzymes are chosen from proteolytic enzymes, fungal β-glucanases and fungal xylanases.

Preferably, in the process said syrup is supplemented with sucrose and diluted with demineralized and deoxygenated water so as to obtain a rediluted solution assaying about 4° Brix, the amount of sucrose present in said rediluted solution representing the equivalent of 1° Brix, and assaying less than 0.005% by volume of alcohol.

Preferably, in the process said rediluted solution is supplemented with propylene glycol alginate and flavored by means of flavor compounds chosen from the flavor compounds condensed and recovered during the evaporation, essential oils of fine hops, preisomerized hop extracts and naturally occurring flavor components of beer.

Preferably, in the process after the flavoring, said rediluted solution is cooled to about +2° C., saturated with $CO_2$ and filtered on a kieselguhr filter.

It was found to be advantageous, according to the invention, in order to obtain as final product an alcohol-free beer, or AFB, having ideal organoleptic properties, to first prepare an alcoholic beer which is special both with respect to the choice of raw materials and the mashing characteristics, termed HM beer, before subjecting it to a dealcoholization by distillation. This HM beer is a lager type pale ale.

Malts rich in nitrogenous substances, not highly disintegrated and more highly colored than normal, are preferably selected and tannin-free hop extracts are preferably used. The mashing stage uses a "high-gravity" technique to produce a wort rich in non-fermentable extracts but easily filterable. β-Glucanases are added at the beginning of the mashing-in and the amount of hops added is small. The fermentable sugars are completely removed during fermentation and the maturation of the beer makes it possible to develop organoleptic characteristics specific to lager beer.

The distillation is preceded by a vacuum decarbonation during which the most volatile flavor compounds are entrained and partially recovered.

The distillation is carried out under high vacuum (pressure of the order of 60 to 100 millibars) and at moderate temperature (50°–65° C.) such that the fraction of the liquid distilled off is relatively large, of the order of 50% of the initial volume, and that the residual ethanol concentration in the dealcoholized aqueous phase, or beer concentrate, is less than 0.03% by volume. A person skilled in the art will easily understand that redilution of this beer concentrate with water for blending gives an AFB whose residual ethanol content is below the analytically measurable limit.

The dilution ratio, that is to say the Brix value of the finished product, of the order of 4.0°, is chosen so as to obtain a taste which is as close as possible to an alcoholic lager beer.

According to a preferred variant, the 4.0° Brix values is obtained by mixing the equivalent of 3° Brix derived from the beer concentrate obtained by distillation of the alcohol, and of 1° Brix of sugar or syrups rich in oligo- and polysaccharides.

The product thus diluted is flavored by means of the flavor compounds recovered during the preevaporation and decarbonation operations, in proportion to the quantity of beer concentrate used. Depending on the tastes of the customers, the flavor may be enhanced using bitter aromatic plant extracts and beer derivatives which are available on the market. The flavor note of the hops is produced by the addition of essential oils of fine hops. This hop-based note is adjusted according to the customers of the countries consuming this AFB. The addition of preisomerized hop extracts make it possible to adjust the bitterness desired in the finished product.

The mixture obtained is carbonated with $CO_2$, then filtered, and the AFB thus obtained is ready to be drawn off into bottles or kegs.

The colloidal stability of the AFB thus obtained is particularly long, greater than two years, even if the AFB is preserved at room temperature. Under these same conditions, the organoleptic stability of the AFB is also greater than two years.

According to a particularly preferred variant of the present invention, after distillation, the concentrate, assaying about 16° Brix is recovered and undergoes another concentration in a second double-effect vacuum evaporator so as to produce a concentrate assaying 45° to 60° Brix. This concentrate, drawn off aseptically, can be preserved for more than four months, possibly for more than six months at low temperature. This embodiment of the present invention makes it possible to produce an intermediate product, the AFB concentrate, which can be advantageously sold as it is: which indeed allows substantial savings on the cost of transportation as well as the production of AFB on the customers' premises even in the absence of installations for brewing and maturation, by means of a dilution operation in two relatively simple stages requiring only a minimal technical installation.

Redilution of the concentrate comprises first a predilution stage (with very pure water) until a syrup of 20° Brix is obtained. This syrup is subjected to an enzymatic digestion, for 18 to 48 hours, by means of a mixture of enzymes comprising proteolytic enzymes and glucanases. The aim of this enzymatic reaction is to facilitate filtration of the final solution. Subsequent operations for preparing the AFB from this syrup, that is to say the dilution, the addition of flavorings, the carbonation and the filtration are similar to the corresponding operations performed on the AFB concentrate and which have been already described above.

The characteristics and advantages of the present invention will be understood more clearly by a person skilled in the art by means of the detailed description below of two preferred embodiments of the present invention, as well as of the process diagram and the description of the schematic representation of the installation using these processes.

DESCRIPTION OF THE PREFERRED EMBODIMENT(S)

The HM beer is produced in a brewing unit of a known type which need not be described here.

Figure 1:
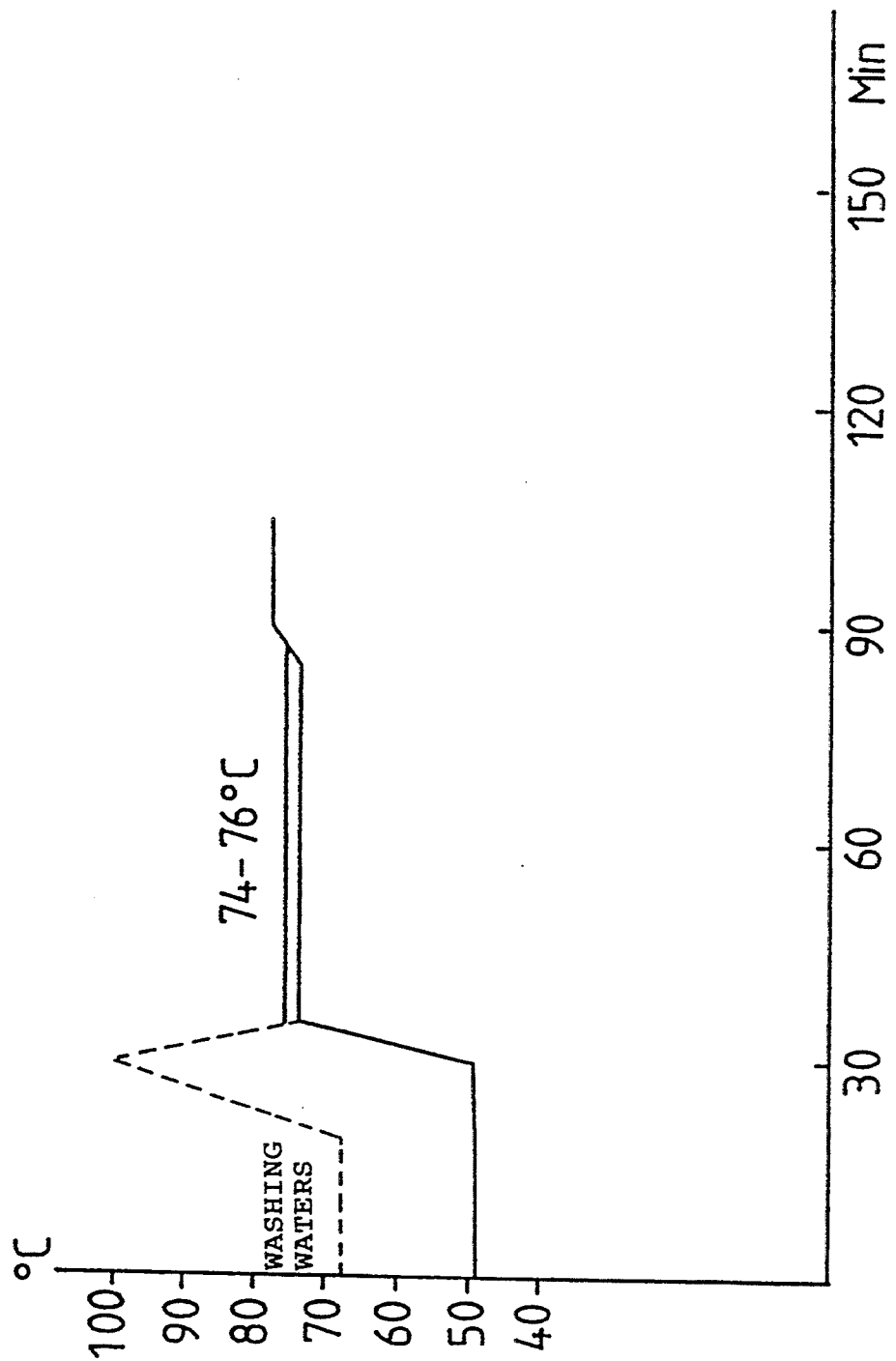
FIG. 1 shows the mashing-in diagram used during mashing of the HM beer.

The process for the manufacture of lager type pale ales is also known in its entirety to persons skilled in the art and will therefore only be described and illustrated by the diagram in FIG. 1 inasmuch as necessary to reveal the specific characteristics of the special HM beer intended for the vacuum distillation.

The malts used are pale malts which are poorly disintegrated and relatively rich in soluble and total nitrogenous substances (12.8 to 13%). The mixture of malts comprises between 20 and 30% of brown malt. The coloration is between 24 and 35 EBC.

The doughed-in malt is manufactured by a thick doughing-in process, 2.3–2.8 hl, and preferably 2.3 to 2.5 hl, per 100 kg of malt. At the start of the mashing-in, the pH is adjusted so as to obtain a value of 5.4–5.6, and a $\beta$-glucanase is added (360–550 g/t of doughed-in malt). The doughing-in temperature is 50° C. and the doughing-in time is reduced compared with the times generally used, preferably to less than 40 min.

The mashing is performed by infusion. The rise in temperature up to the saccharification plateau should be rapid, not less than 3° C./min. According to the diagram in FIG. 1, the saccharification temperature, 74° C., is reached in 5 min. The saccharification rest, at 74–76° C. is 35 to 50 min. The rise to 78° C. and the filtration are then as rapid as possible (the filtration should not exceed 200 min). The boiling lasts for 60 to 80 min, and the pH at the termination of boiling is between 4.95 and 5.15. The coloration at the termination of boiling is 20–25 EBC.

The wort obtained has a real attenuation limit of 48–53% and its original gravity is 15.8°–16.8° Plato. The amount of hops added is small.

With this mashing scheme, the fermentable sugar content is less than those generally obtained in worts and preferably represents not more than 50% of the total extract.

During fermentation, there is complete removal of the fermentable sugars. Maturation is carried out so as to develop the organoleptic characteristics specific to a lager beer. After the maturation, the beer is filtered and stabilized with PVPP (polyvinylpolypyrolidone).

Figure 2:
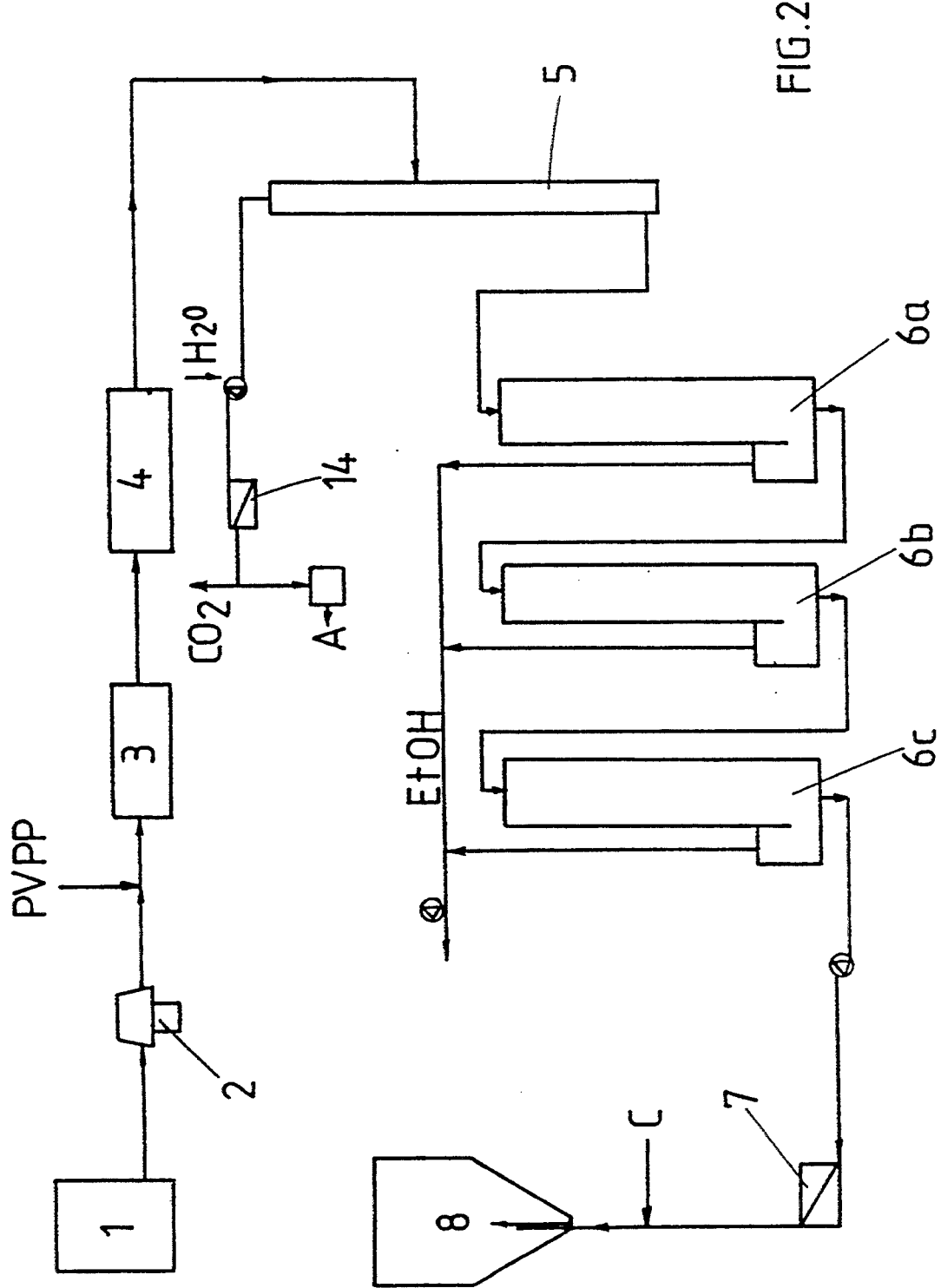
FIG. 2 is a diagram showing the dealcoholization of the HM beer, in which 1 designates a tank for storing the alcoholic beer after maturation, 2 designates a centrifuge, PVPP symbolizes the injection of polyvinylpolypyrolidone, 3 designates a filter, 4 designates a buffer tank, 5 designates the column for preheating and degassing under fore pressure, 14 designates a device for cooling and condensing the flavorings A, which is known per se, 6a, 6b, 6c designate the three stages of the evaporator, EtOH symbolizes the alcohol outlet, 7 designates a cooler, C symbolizes the injection of charcoal and 8 designates the buffer tank where the concentrate at 17° Brix is stored.
Figure 3:
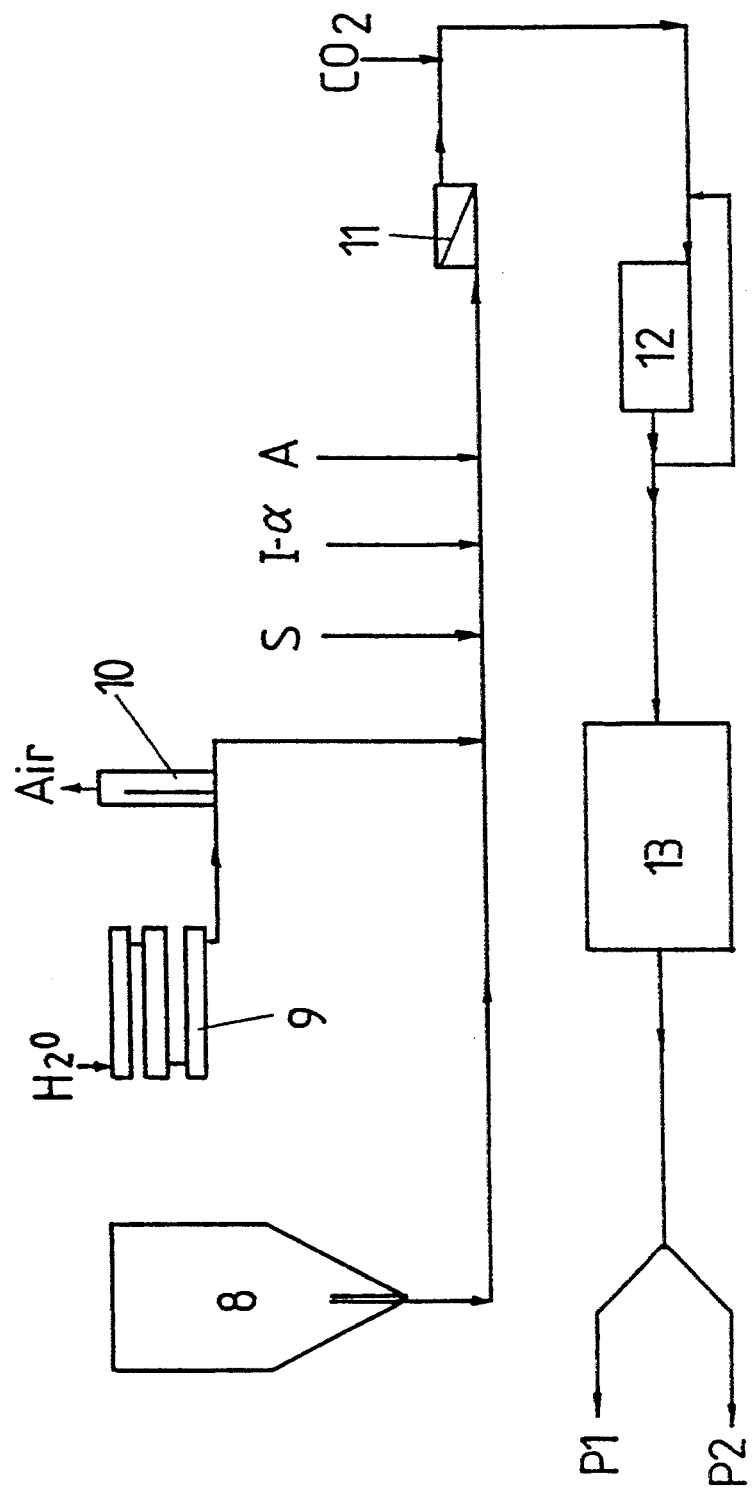
FIG. 3 is a diagram showing the dilution of the concentrate and the manufacture of the AFB, in which 8 designates the same buffer tank, $H_2O$ symbolizes the inlet for untreated water, 9 designates a device for purification by reverse osmosis and 10 a device for removing air dissolved in this water, both known per se, S, I-$\alpha$ and A respectively symbolize the addition of sugar, flavor compounds from preisomerized hops and flavor compounds recovered from the preceding stage, 11 designates a cooler and $CO_2$ symbolizes regassing, 12 designates a kieselguhr filter, 13 designates a tank for storing the AFB at 4° Brix, under pressure, and P1 and P2 symbolize the outlets towards two units for packaging, bottling and drawing off into casks respectively, which are known per se.

The process for the dealcoholization of the HM beer and the manufacture of AFB will now be described in the examples below with reference to FIGS. 2 and 3

EXAMPLE 1

The centrifuged and stabilized HM beer, intended to be dealcoholized is pumped into a supply buffer tank. A preheating under vacuum allows decarbonation. The beer is aspirated under vacuum (pressure of 60–100 milli-bars) into the preheating column (50°–55° C.). This preheating under a fore pressure releases the $CO_2$ from the beer and, at the same time, part of the ethanol is distilled off, entraining part of the flavour compounds. The aromatic alcohol vapors are condensed and recovered in the vacuum pump. A substantial portion of this alcohol-flavor compound mixture is condensed in the water of the water ring of the (water-sealed) vacuum pump. This water, which is treated by a circulation system, is enriched 280× with flavor compounds. The overflow of this solution of flavor compounds is recovered and stored, and will be incorporated into the AFB during the final phase of its production, as will be described below. The foam which forms during degassing of the beer is condensed inside the column whose height is calculated for this purpose.

It should be noted that this decarbonation constitutes a first evaporation, concentration and dealcoholization phase.

At the outlet of the preheating column, the degassed beer is continuously evaporated, that is to say distilled, by passing through a three-stage falling flow evaporator. The temperatures must be between 50° and 65° for vacuums of 60 to 100 millibars.

The use of a 3-stage falling flow evaporator working under vacuum ensures that the beer remains for a short time in the evaporator. The temperatures of the product are sufficiently low to exclude any caramelization and not to influence the organoleptic characteristics of the product. The dealcoholized concentrate leaving the evaporator has a dry matter concentration of 14 to 18%. The ethanol concentration of the dealcoholized concentrate is less than 0.04% by weight since the stagewise distillation under vacuum ensures a maximum separation and dealcoholization effect. The evaporation factor is of the order of 50%. The heat exchanges during the various stages of the distillation are multiplied as much as possible so as to avoid sudden temperature rises and to save the heat as efficiently as possible. The alcohol vapors undergo, in an attached additional column, a rectification which does not form part of the present invention.

At the outlet of the evaporator, 140 to 200 g of activated charcoal are added in-line per hl of concentrate. The concentrate is recovered and stored in cylindroconical tanks at 5° C. for 18 hours. These tanks are provided with a strainer system which retains the charcoal when the liquid is drawn off.

The ratio of dilution of the concentrate with water for dilution is determined following organoleptic tests so that the finished product assays 4.0° Brix. The water for dilution must be particularly pure and low in nitrate, and additionally contain less than 0.1 mg/l of $O_2$. The dilution is carried out using water which has undergone demineralization by reverse osmosis so as to assay less than 1.8° dH in total hardness and to contain less than 7 mg/l of $CL^-$ and 10 mg/l of $NO_3^-$. The concentrate is diluted to 3° Brix (which corresponds to the apparent specific gravity of a lager beer) and the equivalent of one degree Brix is added in proportion by means of a sucrose solution in the form of extremely well refined cane sugar.

The flavor compounds recovered during the pre-evaporation operations (flavor compounds of the "sealing water") are reintroduced into this dilution in proportion to the quantity of beer concentrate used. The bitterness of the product is adjusted by the addition of preisomerized and flavored hop extract (4–10 mg/l). The beer flavor can also be enhanced, according to the wishes of the customers, by the addition of naturally occurring flavor components of beer which are found on the market.

The flavored solution thus obtained is carbonated to 5–5.5 g/l of $CO_2$ before filtration. The dealcoholized and recarbonated beer is finally subjected to a filtration on a kieselguhr filter so that its haze is less than 0.25 EBC (formazin). The alcohol-free beer thus finished is ready to be drawn off into bottles and into kegs.

EXAMPLE 2

Production of storable AFB concentrate

After the dealcoholization by distillation described in Example 1, the concentrate obtained undergoes a second vacuum evaporation by passing through a double-effect falling film evaporator so as to obtain a concentrate assaying between 45° and 65° Brix. The evaporation temperature is maintained below 60° C. so as to preserve the organoleptic qualities of the beer. At the outlet of the evaporator, the concentrate is flavored using the beer flavor components recovered during the dealcoholization step (see Example 1). The naturally occurring flavor components of hops may also be added at this stage if it is desired to enhance the "Pilz" character of the final AFB. Under continuous production, these flavoring operations are carried out in-line, by proportionate injection, using dosing pumps.

The flavored concentrate is then flash pasteurized, then aseptically drawn off and preserved in bag-in-box type aseptic and anaerobic plastic bags of 220 kg. Packaged in this manner, the concentrate stored at 10° C. has a shelf life of more than 6 months and can be sold as it is to a customer who will himself carry out the redilution and the finishing of the AFB.

EXAMPLE 3

Production of AFB from the 45°–60° Brix concentrate.

The production of AFB from the concentrate comprises a first predilution and enzymatic pretreatment stage: the concentrate is diluted with osmosed water with a total hardness of less than 1.8° dH containing less than 7 mg/l of $CL^-$, less than 10 mg/l of $NO_3^-$ and less than 0.2 mg/l of $O_2$, to obtain a syrup assaying 20° Brix. The dilution is carried out at a temperature of 18° C., ±2° C., in a sterile tank provided with a slow stirrer, under a $CO_2$ atmosphere at 0.1 bar.

During this predilution, there is injected in-line a mixture of enzymes composed of:
proteolytic enzymes (600–1200 NF/kg of C45)
fungal β-glucanase (400–700 u/kg of C45)
fungal xylanase (350–600 uCMC/kg of C45)

The enzyme-enriched solution is incubated for 18 to 24 hours, at 18°±2° C., with constant stirring.

At the end of the incubation, before the final dilution operations, a sucrose solution is added in sufficient amount so as to correspond to the equivalent of 1° Brix in the final volume of AFB.

After the enzymatic treatment and the addition of sucrose, the syrup is diluted with deaerated osmosed water (see above), so as to obtain a solution assaying 4.0±0.2° Brix. During the dilution operation, a propylene glycol alginate (E405) solution is injected, in proportionate amounts, using dosing pumps, in an amount of 3–6 g/hl of final AFB; a solution of preisomerized aromatic hop extract is also injected in an amount of 10–20 IBU (quantity variable according to the customers' tastes). Depending on the requirement of the customer, the flavor may also be supplemented with an additional beer flavor component which exists on the market (amount: 1.5–8 ml/hl).

The beer thus obtained must assay less than 0.005% by volume of alcohol.

The beer is stabilized by the addition of ascorbic acid (1–2 g/hl).

The AFB is then cooled to +2° C. and saturated with $CO_2$ (5.0–5.5 g/l). The AFB is finally filtered on a kieselguhr filter so that its haze is less than 0.5 BEC (formazin). The AFB, thus finished, is ready to be drawn off into bottles or casks.

In conclusion, it should be noted that the AFB can be obtained from the dealcoholized HM beer both by direct redilution of the concentrate assaying about 16°

Brix and from the concentrate assaying 45 to 60° Brix, a storable intermediate product.

The AFB obtained by either of these embodiments of the invention differs from the other AFBs of the prior art by:
a. its particularly long colloidal stability which confers on it a high brilliance (EBC formazin haze unit of less than 1.0 EBC) after preserving for 24 months at room temperature (about 20° C.). In some AFB samples according to the invention, a haze of only 1.7 EBC was measured after storing for 54 months at 20° C.
b. its high organoleptic stability: during triangle taste panel testing, the difference is insignificant between fresh AFBs and AFBs aged for more than 24 months, produced according to the present invention.

From the commercial point of view, the shelf life of the finished product can be estimated at more than three years.

I claim:

1. A process for the manufacture of an alcohol-free pale beer whose organoleptic properties are those of a lager beer, comprising
the manufacture of a lager type alcoholic pale beer from pale malts containing from about 12% to about 1.3% of nitrogenous substances and from 20% to 30% of brown malts mashed so as to obtain a wort whose attenuation is of the order of 50% and original gravity of the order of 16%,
the dealcoholization of the said alcoholic pale beer by evaporation, under high vacuum, of at least about 50% of the volume of this beer, wherein said dealcoholization comprises a decarbonation stage and a distillation stage,
at least one dilution with water, wherein the said water is deoxygenated and demineralized water having a total hardness of less than 1.8° dH.

2. The process as claimed in claim 1 wherein, 2.3 to 2.5 m$^3$ of water are used for doughing in one ton of malt and 360 to 550 g of β-glucanase are added per ton of doughed-in malt.

3. The process as claimed in claim 1, wherein the mashing is carried out by infusion, wherein the doughing-in time is reduced to less than 40 min and the rise to the saccharification temperature is performed at a rate of not less than 3° C./min, so that the fermentable sugars represent not more than 50% of the total extract.

4. The process as claimed in claim 3, wherein the fermentable sugars are completely removed during fermentation and wherein after maturation, the beer is filtered and stabilized by the addition of polyvinylpolypyrolidone.

5. The process as claimed in claim 1, wherein said evaporation is performed continuously and comprises:
a decarbonation stage at a pressure of 0.06–0.1 bar, during which a portion of the ethanol and the flavor compounds are entrained by $CO_2$ and partially condensed and recovered,
a distillation stage at a pressure of 0.06–0.1 bar, at a temperature of between 50° and 65° C., the flavor compounds condensed with the ethanolic phase being partially extracted and recovered, for obtaining a first concentrate.

6. The process as claimed in claim 5, wherein the first concentrate obtained by said evaporation is diluted with demineralized and deoxygenated water, wherein said water is obtained by reverse osmosis so as to assay less than 1.8° dH and total hardness and contain less than 7 mg/l of Cl and 10 mg/l of $NO_3$.

7. The process as claimed in claim 6, wherein, between the distillation and the dilation, said concentrate is supplemented with 140 to 200 g of activated charcoal per hectoliter of said concentrate, then stored for about 18 hours at 5° C. and wherein said concentrate is separated from said activated charcoal before said dilution.

8. The process as claimed in claim 6, wherein said dilute solution is flavored by means of flavor compounds condensed with the ethanol and recovered during the decarbonation, combined with flavor compounds selected from essential oils of fine hops, preisomerized hop extracts and naturally occurring flavor components of beer.

9. The process as claimed in claim 5, wherein said first concentrate obtained by said evaporation is subjected to a second vacuum evaporation at a temperature of less than 60° C. until a second concentrate assaying between 45° and 65° Brix is obtained.

10. The process as claimed in claim 9, wherein said second concentrate is pasteurized and aseptically drawn off into airtight, aseptic and anaerobic containers.

11. The process as claimed in claim 9 wherein said second concentrate is prediluted with demineralized and deoxygenated water until a syrup with a concentration of the order of 20° Brix is obtained and wherein said syrup undergoes an enzymatic treatment, at about 18° C., for a period of 18 to 24 hours.

12. The process as claimed in claim 11, wherein said enzymes are chosen from proteolytic enzymes, fungal β-glucanases and fungal xylanases.

13. The process as claimed in claim 12, wherein said syrup is supplemented with sucrose and diluted with demineralized and deoxygenated water so as to obtain a rediluted solution assaying about 4° Brix, the amount of sucrose present in said rediluted solution representing the equivalent of 1° Brix, and assaying less than 0.005% by volume of alcohol, wherein said demineralized and deoxygenated water is obtained by reverse osmosis so as to assay less than 1.8° dH of total hardness and to contain less than 7 mg/l of Cl and 10 mg/l of $NO_3$ and less than 0.1 mg/l of $O_2$.

14. The process as claimed in claim 13, wherein said rediluted solution is supplemented with propylene glycol alginate and flavored by means of flavor compounds chosen from the flavor compounds condensed and recovered during the evaporation, essential oils of fine hops, preisomerized hop extracts and naturally occurring flavor components of beer.

15. The process as claimed in claim 14, wherein, after the flavoring, said rediluted solution is cooled to about +2° C., saturated with $CO_2$ and filtered on a kieselguhr filter.

16. A process for the manufacture of an alcohol-free pale beer whose organoleptic properties are those of a lager beer, comprising
the manufacture of a lager type alcoholic pale beer from pale malts containing between about 12% and 13% of nitrogenous substances and from 20 to 30% of brown malts, mashed so as to obtain a wort whose attenuation is of the order of 50% and original gravity of the order to 16%,
the dealcoholization of the said alcoholic pale beer by first evaporation, under vacuum, at least a temperature of less than 60° C., of at least about 50% of the volume of this beer, wherein said dealcoholized product obtained by said first evaporation is subjected to a second vacuum evaporation at a temperature of less than 60° C. until a second concentrate assaying between 45° and 65° Brix is obtained, and wherein said second concentrate is flash pasteurized and aseptically drawn off into airtight, aseptic and anaerobic plastic bags.

17. A concentrate as obtained by a process as claimed in claim 16.

18. A concentrate as obtained by a process as claimed in claim 9.

* * * * *